US012734567B2

(12) United States Patent
Hoang et al.

(10) Patent No.: US 12,734,567 B2
(45) Date of Patent: Sep. 15, 2026

(54) METHOD FOR TREATING SOIL CONTAMINATED WITH HYDROCARBONS, IN PARTICULAR WITH POLYCYCLIC AROMATIC HYDROCARBONS

(71) Applicant: Amrize Technology Switzerland LLC, Zug (CH)

(72) Inventors: Le-Chien Hoang, Holderbank (CH); Nouffou Tapsoba, Holderbank (CH); Ivan Serclerat, Holderbank (CH)

(73) Assignee: Amrize Technology Switzerland LLC, Zug (CH)

( * ) Notice: Subject to any disclaimer, the term of this patent is extended or adjusted under 35 U.S.C. 154(b) by 1142 days.

(21) Appl. No.: 17/763,040

(22) PCT Filed: Oct. 7, 2020

(86) PCT No.: PCT/EP2020/078078

§ 371 (c)(1),
(2) Date: Mar. 23, 2022

(87) PCT Pub. No.: WO2021/069478

PCT Pub. Date: Apr. 15, 2021

(65) Prior Publication Data

US 2022/0410232 A1 Dec. 29, 2022

(30) Foreign Application Priority Data

Oct. 7, 2019 (FR) ...................................... 1911106

(51) Int. Cl.

*B09C 1/08* (2006.01)
*C04B 14/02* (2006.01)
*C04B 28/04* (2006.01)
*C04B 28/06* (2006.01)
*C04B 28/08* (2006.01)
*C04B 111/00* (2006.01)

(52) U.S. Cl.

CPC .............. *B09C 1/08* (2013.01); *C04B 14/022* (2013.01); *C04B 28/04* (2013.01); *C04B 28/065* (2013.01); *C04B 28/08* (2013.01); *C04B 2111/00767* (2013.01)

(58) Field of Classification Search

None
See application file for complete search history.

(56) References Cited

U.S. PATENT DOCUMENTS 4,230,568 A 10/1980 Chappell
5,536,898 A 7/1996 Conner et al.
5,700,107 A * 12/1997 Newton .................. C04B 28/02 588/256
2002/0111525 A1* 8/2002 Pal ............................ B09C 1/08 588/13
2007/0240620 A1 10/2007 Ramme
2017/0333962 A1* 11/2017 Noland .................... B01J 20/20

FOREIGN PATENT DOCUMENTS

| | | | | |
|---|---|---|---|---|
| CN | 1792967 | A | 6/2006 | |
| CN | 106269836 | A | 1/2017 | |
| CN | 107267151 | A | 10/2017 | |
| CN | 107446586 | A * | 12/2017 | ............. C09K 17/40 |
| EP | 0 562 969 | A1 | 9/1993 | |
| EP | 0 619 278 | A2 | 10/1994 | |
| FR | 2 990 363 | A1 | 11/2013 | |
| FR | 3 077 998 | A1 | 8/2019 | |
| JP | 2003164846 | A * | 6/2003 | |

OTHER PUBLICATIONS

Crane. Activated Carbon Preconditioning to Reduce Contaminant Leaching in Cement-Based Stabilization of Soils. Masters Theses 177, (Year: 2013).*
Li et al. Tailoring of Surface Oxygen Containing Functional Groups and Their Effect on Adsorptive Denitrogenation of Liquid Hydrocarbons Over Activated Carbon. AiChe Journal. vol. 49, No. 4 (Year: 2013).*
Ma et al. An innovative method for the solidification/stabilization of PAHs-contaminated soil using sulfonated oil. Journal of Hazardous Materials. 344, 742-748 (Year: 2018).*
Lidia Dabek. Stabilization/solidification of sand contaminated with organic compounds using regenerated activated carbon and cement. Faculty of Civil and Environmental Engineering, Kielce University of Technology, Wiley InterScience (Year: 2009).*
Hebatpuria et al. Immobilization of phenol in cement-based solidified/stabilized hazardous wastes using regenerated activated carbon: leaching studies. Journal of Hazardous Materials, vol. 70, Issue 3, pp. 117-138 (Year: 1999).*
Bates et al. American Creosote Site Case Study Solidification/Stabilization of Dioxins, PCP, and Creosote for $64 per Cubic Yard. Environmental Progress, vol. 21, No. 2 (Year: 2002).*
Firouzbakht et al. Cement-Based and AC-Based Solidification/Stabilization Processes of Aliphatic Hydrocarbons Contaminated Soils in Kharg Island Oil Terminal. Int J Environ Res (Year: 2017).*
International Search Report as issued in International Patent Application No. PCT/EP2020/078078, dated Mar. 3, 2021.

* cited by examiner

*Primary Examiner* — Tanisha Diggs
(74) *Attorney, Agent, or Firm* — Osha Bergman Watanabe & Burton LLP

(57) ABSTRACT

A method for treating soil contaminated with hydrocarbons, in particular with polycyclic aromatic hydrocarbons, includes working the soil with, by weight of soil from 0.1 to 12% of activated carbon; and from 0.1 to 10% of hydraulic binder, the total content of activated carbon and of hydraulic binder in particular ranging between 0.5 and 15%.

16 Claims, No Drawings

METHOD FOR TREATING SOIL CONTAMINATED WITH HYDROCARBONS, IN PARTICULAR WITH POLYCYCLIC AROMATIC HYDROCARBONS

CROSS-REFERENCE TO RELATED APPLICATIONS

This application is the U.S. National Stage of International Application Serial No. PCT/EP2020/078078, filed Oct. 7, 2020, which in turn claims priority to French Application No. 1911106, filed Oct. 7, 2019. The contents of all of these applications are incorporated herein by reference in their entirety.

The present invention concerns a method for treating soil contaminated by hydrocarbons, in particular with polycyclic aromatic hydrocarbons, characterized in that it comprises at least one step of working the soil with activated carbon and hydraulic binder, as well as the product that can be obtained by said method. The present invention also concerns a composition for treating soil contaminated with hydrocarbons comprising activated carbon and hydraulic binder and the use of said composition for treating a soil contaminated by hydrocarbons.

Soil contamination is generally the result of mining, oil, or other industrial activities such as iron and steel, coking or chemicals.

The assessment of contaminated soils and the characterization of pollutants show that these soils are contaminated by pollutants such as heavy metals, sulfates, halogenated solvents, and hydrocarbons.

There is an increasing demand for decontaminating soil that comes with major challenges in terms of public health and environmental protection.

The release of soluble pollutants when they are contacted with water can lead to a significant potential risk of causing environmental pollution during short-term or permanent storage, or the reuse of contaminated soils.

In order to limit this risk, disposal of contaminated soil first requires lowering the hazard class of these soils.

Lowering the hazard class could also make it possible to reuse soil thus treated, for example in road sub-layers or embankments.

Lowering the hazard class of contaminated soil amounts to lowering the level of pollutants that are leachable in water.

In particular, during construction work, the builder is required to treat excavated soil before disposing of it.

Hydraulic binders are already used for treating contaminated waste or soil. Anionic pollutants, such as sulfates or heavy metals, present in contaminated soil can be trapped during the hydration process of a hydraulic binder mixed with the soil to be treated and with water. These elements can be trapped in C—S—H hydrates (calcium silicate hydrate) or ettringite-type sulfoaluminates or calcium monosulfoaluminates. Some components can thus be stabilized in the form of hydroxides.

In French patent application FR3077998, the Vicat company describes the use of a composition comprising a sulfoaluminate clinker for the treatment of sulfate-contaminated soils. In particular, the composition of sulfoaluminate clinker has been optimized so that it does not release chromium or releases less than a standard sulfoaluminate clinker when treating soil.

In French patent application FR2990363, the Ciments Français company describes the use of a composition comprising a sulfoaluminate clinker whose composition has been optimized for increasing its efficacy for the treatment of soils contaminated with sulfates and/or heavy metals.

In these binders, anionic pollutants, such as sulfates or heavy metals present in contaminated soil can be trapped during the hydration process of a hydraulic binder mixed with the soil to be treated and with water. These elements can be trapped in C—S—H hydrates (calcium silicate hydrate) or ettringite-type sulfoaluminates or calcium monosulfoaluminates. Some components can thus be stabilized in the form of hydroxides. Soil can also be contaminated by hydrocarbons, in particular polycyclic aromatic hydrocarbons.

In particular, polycyclic aromatic hydrocarbons (PAH) are generated during the incomplete combustion of organic matter. They can be produced during natural combustion like forest fires, brush fires or volcanic eruptions or be anthropogenic, such as internal combustion engine exhaust and cigarette smoke.

Environmental standards for deeming a soil to be contaminating are becoming stricter. The table below summarizes the limit values acceptable in France.

TABLE 1

| PAH | Limit value for inert waste (a) (mg/kg dry waste) | Observable Impact Value (French acronym: VCI) soil for sensitive use: Residential with cultivation of a vegetable garden (b) (mg/kg dry soil) | Observable impact value (VCI) soil for non-sensitive use: industrial (or commercial) with outdoor work (example: construction projects etc.), for half of the exposure time, and industrial with office activity forthe other half of the exposure time (b) (mg/kg dry soil) |
|---|---|---|---|
| Hydrocarbons (C10-C40) | 500 | Not specified | Not specified |
| Dibenzo(a,h)anthracene | Not specified | 13.9 | 252 |
| Naphthalene | Not specified | 46 | No limit value |
| Anthracene | Not specified | No limit value | No limit value |
| Fluoranthene | Not specified | 6100 | No limit value |
| Chrysene | Not specified | 10350 | 25200 |
| Benzo(a)pyrene | Not specified | 7 | 25 |

TABLE 1-continued

| PAH | Limit value for inert waste (a) (mg/kg dry waste) | Observable Impact Value (French acronym: VCI) soil for sensitive use: Residential with cultivation of a vegetable garden (b) (mg/kg dry soil) | Observable impact value (VCI) soil for non-sensitive use: industrial (or commercial) with outdoor work (example: construction projects etc.), for half of the exposure time, and industrial with office activity forthe other half of the exposure time (b) (mg/kg dry soil) |
|---|---|---|---|
| Benzo(k)fluoranthene | Not specified | 900 | 2520 |
| Indeno (1,2,3-c,d)pyrene | Not specified | 16.1 | 252 |
| Total PAHs | 50 | Not specified | Not specified |

French Regulations:

(a) Decree of Dec. 12, 2014

(b) Guide BRGM/RP-51216-FR October 2001, version 2 “Gestion des sites (potentiellement) et évaluation simplifiée des risques [Site management (potentially) and simplified risk assessment]

Observable Impact Value (VCI) soil for sensitive use: Residential with cultivation of a vegetable garden Observable impact value (VCI) soil for non-sensitive use: industrial (or commercial) with outdoor work (example: construction projects etc.), for half of the exposure time, and industrial with office activity for the other half of the exposure time The invention aims to offer a treatment method for soil contaminated with hydrocarbons, in particular polycyclic aromatic hydrocarbons, said method being efficient, economical, easy to implement on the soil-excavation site (i.e., not requiring the soil to be transported elsewhere) or even on the disposal site, and making it possible to significantly lower the hydrocarbon content of said soil.

Another goal of the invention is to provide a composition exhibiting good reactivity when it is mixed with contaminated soil, especially soil contaminated with hydrocarbons, which makes it possible to limit the cost of decontamination.

These goals are attained by the invention which will be described below.

The first aspect of the invention is a method for treating a soil contaminated with hydrocarbons, in particular polycyclic aromatic hydrocarbons, characterized in that it comprises at least one step of working the soil with, by weight of soil:

- from 0.1 to 12%, preferably 0.25 to 5%, of activated carbon,
- from 0.1 to 10%, preferably 0.25 to 5%, of hydraulic binder, the total content of activated carbon and hydraulic binder being especially comprised between 0.5 and 15%, advantageously between 1 and 12%, preferably between 1 and 7%, more preferably between 2 and 5%.

The hydraulic binder/activated carbon mass ratio is preferably comprised between 0.2 and 9, preferentially between 0.5 and 9, more preferentially between 1 and 4.

The mass ratio can thus be comprised between 1 and 9, preferentially between 0.5 and 4, or even between 0.2 and 4, advantageously between 0.2 and 3, more advantageously between 0.2 and 1.

Within the meaning of the present invention, a method for treating hydrocarbon-contaminated soil is a method that makes it possible to lower the hazard class in hydrocarbon of said soil, by conversion of the hydrocarbons into a less mobile and less toxic form.

The treatment method advantageously allows chemically and/or physically trapping the hydrocarbons within a solid material especially comprising the soil and a hardened hydraulic binder.

In the present invention, the term “soil” means a more or less friable material predominantly made up of earth and/or sand in all possible proportions. Advantageously, the soil contains from 3 to 50%, preferably from 3 to 40%, preferably from 3 to 35%, preferably from 3 to 20%, more preferably from 3 to 15% by weight of water. The weight content in dry matter and water of a soil is typically measured by the gravimetric method, in accordance with standard NF ISO 11465 (A) of August 1994.

In the present invention, the term “hydrocarbon” means one or more organic compound(s) made up of carbon and hydrogen atoms, of molecular formula CnHm where n and m are both natural integers liquid or solid at room temperature. The hydrocarbons can be of any nature and origin. These hydrocarbons can, for example, originate from the activity of factories such as refineries or coking plants, or from pipeline leaks, maritime accidents in oil transport or land accidents in fuel transport. The hydrocarbons can especially be linear, preferably C10 to C40 (i.e. n=10 to 40), or even polycyclic aromatic.

In the present invention, the expression “polycyclic aromatic hydrocarbons” (PAH) means hydrocarbons made up of several benzene rings especially arranged in a linear, angular or clustered manner. A distinction is made between alternating PAHs formed exclusively of benzene rings and non-alternating PAHs composed of at least one ring with 4 or more carbons. PAHs are exclusively made up of carbon and hydrogen compounds although oxygen, sulfur and/or nitrogen can substitute for carbon in at least one benzene ring to form aromatic heterocyclic compounds commonly grouped with PAHs. The following PAHs are well known as soil pollutants: Naphthalene (NAF), Acenaphthene (ACE), Acenaphthylene (ACY), Fluorene (FLE), Anthracene (ANT), Phenanthrene (FEN), Fluoranthene (FLA), Pyrene (PYR), Benzo[a]anthracene (BaA), Chrysene (CRY), Benzo[b]fluoranthene (BbF), Benzo[k]fluoranthene (Bkf), Dibenzo[ah]anthracene (dBA), Benzo[a]pyrene (BaP), Benzol [g,h,i]perylene (GHI) and Indeno[1.2.3]pyrene (IdP).

In the present invention, the expression “soil contaminated with hydrocarbons” means a soil comprising more than 50 mg/kg of hydrocarbons. Quantitative determination of C10-C40 linear hydrocarbons is typically in accordance with standard NF EN ISO 16703 (A) of August 2011 and that relative to PAHs is typically in accordance with standard NF ISO 18287 (A) of August 2006.

Activated Carbon

In the present invention, the expression "activated carbon" designates a material essentially made up of carbon with a porous structure, preferably microporous, and/or mesoporous, having a high surface area, typically greater than 100 $m^2/g$, 250 $m^2/g$, or even 400 $m^2/g$.

The activated carbon used for the implementation of the present invention can be of any origin, and notably can be grafted with additional chemical functions and/or thermally treated. The activated carbons obtained by slow pyrolysis of wood are preferably excluded from the field of the invention, however.

The activated carbon used preferably has a specific surface greater than or equal to 500 $m^2/g$, and is preferably comprised between 450 and 1500 $m^2/g$.

The specific surface area is measured by the technique based on Brunauer, Emmett and Teller (BET) theory, in accordance with ISO 9277:2010 of September 2010.

The activated carbon used can be in the powder form, preferably having a D50 comprised between 5 and 100 μm, more preferably between 10 and 40 μm.

In a particular embodiment, the apparent density of the activated carbon usable in the invention, such as measured in accordance with standard ASTM D2854-09(2019) of September 2019, is comprised between 400 and 600 $kg/m^3$.

In a particular embodiment, the ash content of the activated carbon usable in the invention, such as measured in accordance with standard ASTM D2866-11(2018) of November 2018, is comprised between 10 and 20% by total weight of the activated carbon.

Hydraulic Binder

In the sense of the present invention, a hydraulic binder is a binder that is formed and hardened by chemical reaction with water. The oxide formulas commonly encountered in the field of hydraulic binders are generally abbreviated with a single letter, as follows: C represents CaO, A represents $Al_2O_3$, F represents $Fe_2O_3$, S represents $SiO_2$, $ represents $SO_3$, M represents MgO, and T represents $TiO_2$.

The use of a hydraulic binder in the treatment method of the present invention is advantageous especially in that during treatment, the hydraulic binder absorbs the water and then hardens, thus forming a matrix in which the activated carbon is encased, which itself contains the adsorbed hydrocarbons. Thus, the use of a hydraulic binder makes it possible to encapsulate the activated carbon and totally or partially prevent release of hydrocarbons by the activated carbon when the treated soil is stored.

Moreover, this hardening makes it possible to consolidate the mixture and immobilize the activated carbon. Thus, the mixture can be easily handled and transported (especially by land transport) without the activated carbon that adsorbed the hydrocarbons being able to fly away and become a source of pollution in turn.

In one embodiment of the invention, the hydraulic binder is a common cement such as defined in standard NF EN 197-1 of April 2012, preferably a CEM I, CEM II, CEM III, CEM IV or CEM V type cement as described in NF EN 197-1 of April 2012.

Thus, in the case where the binder used is a CEM I cement, it is preferable that the soil be worked with, by weight of soil:

from 0.1 to 12%, preferably 0.25 to 5%, of activated carbon, from 0.1 to 10%, preferably 0.25 to 5%, of CEM I cement, the total content of activated carbon and CEM I cement being especially comprised between 0.5 and 15%, advantageously between 1 and 12%, preferably between 1 and 7%, more preferably between 2 and 5%.

Advantageously, the hydraulic binder is a CEM III A, B or C, type cement, i.e. a so-called cement obtained by mixing a Portland clinker with 30 to 90% by weight, preferably 36 to 95% by weight of blast furnace slag. Indeed, the blast furnace slag fixes the carbons with latent reactivity and therefore higher stability over time.

In this case, it is preferable that the soil be worked with, by weight of soil:

from 1 to 5% of activated carbon;

from 0.25 to 5% of CEM III A, B or C cement;

the total content of activated carbon and CEM I cement being comprised between 2 and 5%.

The preferred CEM III cement is CEM III A or CEM III B.

In another embodiment, the hydraulic binder is a sulfoaluminate cement. It is well known in the field of hydraulic binders that there are different types of sulfoaluminate cements differentiated according to their composition in terms of mineral phases. An alite sulfoaluminate cement simultaneously contains ye'elimite and alite (C3S), but no belite. A ye'elimite sulfoaluminate cement is made up of a mixture of ye'elimite (approximately 15-50% by weight), of calcium sulfosilicate or sulfopurrite and anhydrite but does not contain alite. A belite sulfoaluminate cement primarily contains ye'elimite and belite phases and comprises no alite or an alite content of less than or equal to 5% by mass. Thus, in one particular embodiment, the hydraulic binder of the invention can be a sulfoaluminate clinker comprising more than 50% by mass of ye'elimite phase, from 5 to 10% by mass of belite phase and from 1 to 5% by mass of free lime CaO, such as the one developed by the VICAT company and described in French patent application FR3077998, or a sulfoaluminate clinker comprising 5 to 60% by mass of calcium sulfoaluminate possibly doped with iron, 0 to 25% by mass calcium aluminoferrite and 20 to 70% by mass of belite phase, such as the one developed by the CIMENTS FRANÇAIS company and described in French patent application FR2990363.

In the case where the binder used is a sulfoaluminate clinker, it is preferable that the soil be worked with, by weight of soil:

from 0.1 to 12%, preferably 0.25 to 5%, of activated carbon, from 0.1 to 10%, preferably 0.25 to 5%, of sulfoaluminate clinker, the total content of activated carbon and sulfoaluminate clinker being especially comprised between 0.5 and 15%, advantageously between 1 and 12%, preferably between 1 and 7%, more preferably between 2 and 5%.

In another embodiment, the hydraulic binder is a calcium aluminate cement such as those described in standard NF EN 14647 of December 2006.

The main constituent of a calcium aluminate cement is monocalcium aluminate (CaO $Al_2O_3$). Its other constituents are calcium aluminoferrites, dicalcium silicate and calcium silico-aluminate. For example, the aluminate cement is an aluminate cement of the TERNAL® line sold by IMERYS ALUMINATES.

In the case where the binder used is a calcium aluminate cement, it is preferable that the soil be worked with, by weight of soil:

from 0.1 to 12%, preferably 0.25 to 5%, of activated carbon, from 0.1 to 10%, preferably 0.25 to 5%, of calcium aluminate cement, the total content of activated carbon and calcium aluminate cement being especially comprised between 0.5 and 15%, advantageously between 1 and 12%, preferably between 1 and 7%, more preferably between 2 and 5%.

The binder is advantageously chosen from among a CEM I cement such as defined in standard NF EN 197-1 of April 2012, a CEM III A, B or C cement comprising between 30% and 90% by weight of ground blast furnace slag, a sulfoaluminate cement or a calcium aluminate cement.

Addition of Activated Carbon and Hydraulic Binder

In one embodiment, the hydraulic binder and the activated carbon are added simultaneously to the soil, optionally in the form of a composition such as defined in the third aspect of the invention. Advantageously, the treatment method according to the invention comprises at least the following successive steps:

a) provide the soil;
b) add the hydraulic binder and activated carbon to the soil together, optionally in the form of a composition such as defined in the third aspect of the invention;
c) work the mixture of step b);
d) optionally, a hardening step.

In another embodiment, the activated carbon and hydraulic binder are added to the soil separately, a working step being optionally interspersed between the two addition steps. The activated carbon is preferably added first. Advantageously, the treatment method according to the invention comprises at least the following successive steps:

a) provide the soil;
b) separately add the activated carbon and the hydraulic binder to the soil. A working step can optionally be interspersed between these two additions, the activated carbon being preferably added first;
c) work the mixture of step b);
d) optionally, a hardening step.

Advantageously, the soil is treated by using only activated carbon and hydraulic binder, and optionally water.

In other words the implementation of the method advantageously does not require the use of other curing products, whether solid or liquid, organic or mineral.

The implementation of the working and hardening steps are detailed below.

Working

Within the meaning of the present invention, the action of working consists of mixing the soil, activated carbon and hydraulic binder by rotation in a container that preferably contains a mixing screw, for example an Archimedes screw, or at least one blade.

Any type of mixer can be used, in particular an industrial mixer, especially a continuous or discontinuous mixer. The mixer can be open or closed.

Working can, for example, be performed using a stationary concrete mixer or mixer truck. The working step can last between 1 minute and 2 hours, for example between 1 minute and 30 minutes or even between 30 minutes and 2 hours, depending on the volume of mixture to be worked.

A rest time can optionally be observed after a working step.

The method of the invention can also comprise a step of adding water so as to adjust the water content of the soil to be treated before the working step. This addition can also be performed during the working step. For example, the water content of the soil can be adjusted so that the soil entering into the working step contains from 3 to 50%, preferably from 3 to 40%, preferably from 3 to 35%, preferably from 3 to 20%, more preferably from 3 to 15% by weight of water.

Hardening Phase

The method of the invention preferably comprises a step of hardening the worked mixture of hydraulic binder, activated carbon and soil.

This hardening phase can last, for example, from 15 minutes to 30 days, depending on the volume worked, and does not require any particular intervention, such as, for example, the addition of a curing product.

This hardening phase can take place at a temperature comprised between 0 and 40° C.

Very advantageously, this hardening step can take place on the same site as working or after transporting the worked mixture to a storage site.

Result

At the end of the treatment method according to the invention, the treated soil contains at most 10 to 4000 mg of hydrocarbons, in particular PAH, per kg of dry soil, for example at most 3000 mg, preferably 2000 mg/kg, more preferably 1000 mg/kg of hydrocarbons per kg of treated soil.

In particular, the total PAH content of the contaminated soil resulting from the method of the invention is preferably comprised between 50 and 2000 mg/kg of dry soil, preferably is less than 1000 mg/kg, 750 mg/kg or 500 mg/kg of dry soil.

Product Obtained by the Method

According to a second aspect, the invention concerns a product that can be obtained at the end of the method of the invention, characterized in that it comprises soil, a hardened hydraulic binder and activated carbon such as defined above.

Soil Treatment Composition

According to a third aspect, the invention concerns a composition for the treatment of soil contaminated by hydrocarbons, especially polycyclic aromatic hydrocarbons, comprising in % by weight:

between 10 and 80%, preferably between 50 and 80%, of a hydraulic binder such as defined in the first aspect of the invention;

between 10 and 80%, preferably between 10 and 30%, of activated carbon such as defined in the first aspect of the invention.

The composition advantageously comprises between 70 and 80%, preferably between 70 and 75% by weight of hydraulic binder and/or between 20 and 30%, preferably between 25 and 30% by weight of activated carbon.

The composition can also advantageously comprise between 10 and 30%, preferably between 20 and 30%, more preferably between 25 and 30% by weight of hydraulic binder and/or between 50 and 80%, preferably between 70 and 75% by weight of activated carbon.

In one embodiment, said composition comprises a Portland cement such as defined in standard NF EN 197-1 of April 2012, a CEM III cement, preferably a CEM III A, B or C cement comprising between 30% and 90% by weight of ground blast furnace slag, a sulfoaluminate or calcium aluminate cement, preferably a slag cement of type CEM III comprising between 34% and 90% by weight of blast furnace slag.

According to a fourth aspect, the invention concerns the use of the composition for soil treatment as defined in the third aspect of the invention for the treatment of soil contaminated by hydrocarbons, especially polycyclic aromatic hydrocarbons.

EXAMPLES

Binders Used

TABLE 2

| Binder nature | Binder type | Supplier |
|---|---|---|
| CEM I 52, 5N SPLC | Portland cement | LafargeHolcim - Saint Pierre La Cour factory |
| CEM III A LM | Portland cement with blast furnace slag | LafargeHolcim - La Malle factory |
| TERNALTEP (TEP) | Calcium aluminate cement (CAC) Ternal | IMERYS |

Analysis Methods

The soil content in water and dry matter was determined according to the method described in standard NF ISO 11465(A) of August 1994. The expression "soil dry matter" is abbreviated "DM."

The quantitative determination of C10 to C40 linear hydrocarbons in soil was performed by gas chromatography according to the method described in standard NF EN ISO 16703 of August 2011.

The quantitative determination of polycyclic aromatic hydrocarbons (PAH) in soil was performed by gas chromatography with detection by mass spectrometry (GC-MS), according to the method described in standard NF EN ISO (A) of August 2006.

The BET specific surface area of the various powders is measured as follows. A sample of powder is taken of a mass of from 0.3 g to 0.75 g for a BET surface area estimated at more than 15 $m^2/g$. A cell of 9 $cm^3$ is used. The entire measurement cell (cell+glass rod) is weighed. Then the sample is added to the cell. Then the entirety is weighed (cell+glass rod+sample). The measurement cell is placed on the degassing station and the sample is degassed. The pressure to reach is 25 to 30 mTorr. The time to reach this pressure depends on the nature of the sample, the quantity of matter and the number of cells installed on the degassing station. The degassing step makes it possible to free the sample surface of any adsorption ($H_2O$, CO, $CO_2$, etc.). The sample mass is obtained by subtraction of the mass of the cell from the mass of the cell+degassed sample.

Then the sample is analyzed after putting it place on the measurement station. The analyzer is the Tristar II 3020 sold by Micrometrics. The measurement relies on the adsorption of nitrogen by the sample at a given temperature, here the temperature of liquid nitrogen or −196° C. The device measures the pressure of the reference cell in which the adsorbate is at its saturation vapor pressure and that of the sample cell into which known volumes of adsorbate are injected. The curve resulting from these measurements is the adsorption isotherm. In the measurement method, it is necessary to know the dead volume of the cell: this volume is therefore measured with helium before the analysis.

The mass of the sample calculated previously is entered as a parameter. The BET surface area is determined by linear regression software from the experimental curve. The three samples below are measured regularly in order to serve as a reference for the device:

TABLE 3

| | Mean BET ($m^2/g$) | Standard deviation |
|---|---|---|
| Alumina BCR 1.05 $m^2/g$ | 1.02 | 0.02 |
| Omyacoat 850 | 9.38 | 0.04 |
| Carbon 30.6 ± 0.75 $m^2/g$ | 30.4 | 0.25 |

Soils Studied

In the context of the tests performed in the laboratory different soils were sampled from different construction sites. Their characteristics are given in the table below. The soil samples SN1 and SN2 are highly contaminated, while the soil sample SSL is not very contaminated.

It can be observed that the soil samples are effectively contaminated by organic compounds and that the benzo(a) pyrene content of sample SN2 is greater than the limit value given in the Decree of Dec. 12, 2014.

TABLE 4

| Parameter | Unit | Method | SN1 | SN2 | SSL |
|---|---|---|---|---|---|
| Dry matter | % of soil received | NF ISO 11465(A) | 92.0 | 96.9 | 95.9 |
| C10-C40 linear hydrocarbons | mg/kg DM | NF EN ISO 16703(A) | 1200.0 | 1400.0 | 385.0 |
| C10-C12 linear hydrocarbons | mg/kg DM | NF EN ISO 16703(A) | <20 | <70 | <40 |
| C12-C16 linear hydrocarbons | mg/kg DM | NF EN ISO 16703(A) | 26.5 | 43.0 | <40 |
| C16-C21 linear hydrocarbons | mg/kg DM | NF EN ISO 16703(A) | 320.0 | 450.0 | 125.0 |
| >C21-C35 linear hydrocarbons | mg/kg DM | NFEN ISO 16703(A) | 820.0 | 835.0 | 230.0 |
| C35-C40 linear hydrocarbons | mg/kg DM | NF EN ISO 16703(A) | 39.0 | <70 | <40 |
| PAH - Naphthalene | mg/kg DM | NF ISO 18287(A) | 2.6 | 4.3 | 1.3 |
| PAH - Acenaphthylene | mg/kg DM | NF ISO 18287(A) | 0.7 | <0.5 | <0.5 |
| PAH - Acenaphthene | mg/kg DM | NF ISO 18287(A) | 4.1 | 8.6 | 2.4 |
| PAH - Fluorene | mg/kg DM | NF ISO 18287(A) | 3.1 | 6.9 | 1.9 |
| PAH - Phenanthrene | mg/kg DM | NF ISO 18287(A) | 27.5 | 59.0 | 16.5 |
| PAH - Anthracene | mg/kg DM | NF ISO 18287(A) | 11.0 | 15.5 | 4.1 |
| PAH - Fluoranthene | mg/kg DM | NF ISO 18287(A) | 85.5 | 108.5 | 27.5 |
| PAH - Pyrene | mg/kg DM | NF ISO 18287(A) | 77.0 | 82.5 | 22.0 |
| PAH - Benzo(a) anthracene | mg/kg DM | NF ISO 18287(A) | 63.5 | 61.5 | 17.0 |
| PAH - Chrysene | mg/kg DM | NF ISO 18287(A) | 74.0 | 59.5 | 14.5 |
| PAH - Benzo(b) fluoranthene | mg/kg DM | NF ISO 18287(A) | 108.0 | 91.0 | 22.0 |
| PAH - Benzo(k) fluoranthene | mg/kg DM | NF ISO 18287(A) | 37.0 | 31.0 | 9.0 |
| PAH - Benzo(a)pyrene | mg/kg DM | NF ISO 18287(A) | 63.5 | 62.0 | 17.0 |
| PAH - Dibenzo(ah) anthracene | mg/kg DM | NF ISO 18287(A) | <12 | <12 | <3.5 |
| PAH - Indeno(123-cd) pyrene | mg/kg DM | NF ISO 18287(A) | 38.0 | 39.5 | 10.5 |
| PAH - Benzo(ghi) perylene | mg/kg DM | NF ISO 18287(A) | 38.5 | 37.0 | 9.9 |
| Total PAH | mg/kg DM | NF ISO 18287(A) | 633.8 | 667.0 | 174.6 |

DM = Soil dry matter

PAH—Polycyclic aromatic hydrocarbons

List of Adsorbents Studied

Different adsorbents were studied and their efficacy for treating organic pollutants was measured.

TABLE 5

| Adsorbent | Supplier |
|---|---|
| Norit SAE/2 SUPER (activated carbon AC1) | Norit |
| EcoSorb XP15 (activated carbon AC2) | Jacobi CARBONS |
| AquaSorb MP23 (activated carbon AC3) | Jacobi CARBONS |
| OXPURE ® 325B-7 (activated carbon AC4) | OXBOW |
| OXPURE ® 325A-5 (activated carbon AC5) | OXBOW |
| Omnim Carb (BIOCHAR wood charcoal) | CARBO France |
| Wood boiler hearth ash WA | ENGIE |

The various activated carbon samples and their characteristics are given in the tables below.

TABLE 6

| Reference | Commercial name | Supplier |
|---|---|---|
| AC1 | Norit SAE/2 SUPER | Norit Electronic |
| AC2 | EcoSorb XP15 | Jacobi CARBONS |
| AC3 | AquaSorb MP23 | Jacobi CARBONS |
| AC4 | OXPURE ® 325B-7 | OXBOW |
| AC5 | OXPURE ® 325A-5 | OXBOW |

TABLE 7

| Parameter | Measurement method | Unit | AC1 | AC2 | AC3 | AC4 | AC5 |
|---|---|---|---|---|---|---|---|
| Iodine index | ASTM D4607 | mg iodine/g | 1050 | 600 | 850 | 650-710 | 500-550 |
| Total surface area (B.E.T) | Described above | $m^2/g$ | 1150 | 650 | 900 | 680 | 530 |
| Apparent density | ASTM D2854 | $kg/m^3$ | 425 | 458 (silo) 610 (packed) | 300 (silo) 460 (packed) | 500 | 500 |

Laboratory Method for Treating Contaminated Soil

The soils were treated in the laboratory according to the following protocol:

Introduce 600 g of dry soil into the bowl of a PERRIER mixer

Introduce 29.4 g of tap water

Mixing phase 1: Mix at slow speed for 1 minute then stop mixing

Introduce the mineral absorbent (hydraulic binder+adsorbent)

Mixing phase 2:

Mix at slow speed for 1 minute then stop mixing

Mix manually while taking care to scrape the sides of the bowl

Mix at slow speed for 1 minute then stop mixing

Cure the treated soil at 20° C. in a hermetic plastic bag for 1 week

Example 1—Treatment of Contaminated Soil by Activated Carbon (Not According to the Invention)

The table below groups the results obtained when the soils are treated only by activated carbon AC1.

The percentages given in line 2 are expressed in mass percent of soil dry matter.

The results show that the use of activated carbon AC1 alone makes it possible to reduce the total PAH content and the greater the quantity of activated carbon AC1 the greater the PAH reduction. It is thus possible to reduce the PAH content by more than 50% to 65% of the total PAH content, when the activated carbon AC1 is used up to a quantity of 3.0%.

TABLE 8

| Soil sample | Unit | SN1 | SN2 | SN1 | SN1 | SN1 | SN1 | SN2 |
|---|---|---|---|---|---|---|---|---|
| Treatment | | — | — | 0.5% AC1 | 1.0% AC1 | 2.0% AC1 | 3.0% AC1 | 3.0% AC1 |
| Soil dry matter | % of soil received | 92.0 | 96.9 | 88.4 | 88.0 | 89.0 | 88.7 | 89.0 |
| C10-C40 linear hydrocarbons | mg/kg DM | 1200.0 | 1400.0 | 1500 | 1600 | 900 | 570 | 850 |
| C10-C12 linear hydrocarbons | mg/kg DM | <20 | <70 | <40 | <40 | <40 | <20 | <40 |

TABLE 8-continued

| Soil sample | Unit | SN1 | SN2 | SN1 | SN1 | SN1 | SN1 | SN2 |
|---|---|---|---|---|---|---|---|---|
| C12-C16 linear hydrocarbons | mg/kg DM | 26.5 | 43.0 | <40 | <40 | <40 | 41 | <40 |
| C16-C21 linear hydrocarbons | mg/kg DM | 320.0 | 450.0 | 400 | 410 | 250 | 190 | 290 |
| >C21-C35 linear hydrocarbons | mg/kg DM | 820.0 | 835.0 | 1000 | 1100 | 580 | 320 | 470 |
| C35-C40 linear hydrocarbons | mg/kg DM | 39.0 | <70 | 52 | 58 | <40 | <20 | <40 |
| PAH - Naphthalene | mg/kg DM | 2.6 | 4.3 | 2.0 | 2.2 | 1.5 | 3.4 | 1.9 |
| PAH - Acenaphthylene | mg/kg DM | 0.7 | <0.5 | 0.60 | 0.60 | 0.49 | 0.50 | <0.5 |
| PAH - Acenaphthene | mg/kg DM | 4.1 | 8.6 | 3.3 | 3.6 | 2.5 | 5.4 | 4.6 |
| PAH - Fluorene | mg/kg DM | 3.1 | 6.9 | 2.3 | 2.5 | 1.6 | 2.9 | 3.6 |
| PAH - Phenanthrene | mg/kg DM | 27.5 | 59.0 | 21 | 22 | 13 | 21 | 28 |
| PAH - Anthracene | mg/kg DM | 11.0 | 15.5 | 9.0 | 7.7 | 3.8 | 6.2 | 5.8 |
| PAH - Fluoranthene | mg/kg DM | 85.5 | 108.5 | 74 | 70 | 42 | 57 | 47 |
| PAH - Pyrene | mg/kg DM | 77.0 | 82.5 | 61 | 60 | 38 | 52 | 37 |
| PAH - Benzo(a) anthracene | mg/kg DM | 63.5 | 61.5 | 43 | 38 | 19 | 19 | 18 |
| PAH - Chrysene | mg/kg DM | 74.0 | 59.5 | 78 | 52 | 25 | 25 | 16 |
| PAH - Benzo(b) fluoranthene | mg/kg DM | 108.0 | 91.0 | 78 | 75 | 47 | 37 | 28 |
| PAH - Benzo(k) fluoranthene | mg/kg DM | 37.0 | 31.0 | 25 | 23 | 13 | 9.0 | 9.0 |
| PAH - Benzo(a)pyrene | mg/kg DM | 63.5 | 62.0 | 46 | 41 | 21 | 15 | 16 |
| PAH - Dibenzo(ah) anthracene | mg/kg DM | <12 | <12 | <6.4 | <5.9 | <3.4 | <1.7 | <4.1 |
| PAH - Indeno(123-cd) pyrene | mg/kg DM | 38.0 | 39.5 | 32 | 28 | 12 | 6.8 | 9.2 |
| PAH - Benzo(ghi) perylene | mg/kg DM | 38.5 | 37.0 | 29 | 26 | 13 | 8.9 | 10 |
| Total PAH | mg/kg DM | 633.8 | 667.0 | 504.8 | 451.9 | 254.8 | 269.7 | 234.4 |

Example 2—Treatment of Contaminated Soil by Wood Charcoal (Not According to the Invention)

The results collected in the table below show that the treatment of contaminated soil by WA and BIOCHAR activated carbon is not effective. The measurements further show that the use of these materials increases the total PAH content.

WA and BIOCHAR wood charcoal are obtained by a slow wood pyrolysis process, called smothering. This combustion method is not complete and hydrocarbon residues remain that are found in the treated soil.

This type of carbon is not suited to the present invention.

TABLE 9

| Soil sample | Unit | SN1 | SN1 | SN1 | SN1 | SN1 | SN1 | SN1 |
|---|---|---|---|---|---|---|---|---|
| Treatment | | — | 2% WA | 3% WA | 5% WA | 2% BIOCH-AR | 3% BIOCH-AR | 4% BIO-CHAR |
| Soil dry matter | % of soil received | 92.0 | 88.3 | 88.1 | 87.9 | 88.7 | 89.1 | 88.9 |
| C10-C40 linear hydrocarbons | mg/kg DM | 1200.0 | 1100 | 1500 | 1300 | 1100 | 1200 | 1300 |
| C10-C12 linear hydrocarbons | mg/kg DM | <20 | <40 | <40 | <40 | <40 | <40 | <40 |

TABLE 9-continued

| Soil sample | Unit | SN1 | SN1 | SN1 | SN1 | SN1 | SN1 | SN1 |
|---|---|---|---|---|---|---|---|---|
| C12-C16 linear hydrocarbons | mg/kg DM | 26.5 | <40 | <40 | <40 | <40 | <40 | <40 |
| C16-C21 linear hydrocarbons | mg/kg DM | 320.0 | 290 | 390 | 270 | 300 | 290 | 290 |
| >C21-C35 linear hydrocarbons | mg/kg DM | 820.0 | 800 | 980 | 850 | 770 | 850 | 970 |
| C35-C40 linear hydrocarbons | mg/kg DM | 39.0 | <40 | 51 | 55 | <40 | <40 | 48 |
| PAH - Naphthalene | mg/kg DM | 2.6 | 5.0 | 5.7 | 2.7 | 4.1 | 2.9 | 2.7 |
| PAH - Acenaphthylene | mg/kg DM | 0.7 | 0.79 | 0.95 | 0.72 | 0.86 | 0.59 | 0.72 |
| PAH - Acenaphthene | mg/kg DM | 4.1 | 7.1 | 8.1 | 4.6 | 6.2 | 4.7 | 4.2 |
| PAH - Fluorene | mg/kg DM | 3.1 | 4.8 | 6.0 | 3.2 | 4.4 | 3.3 | 2.9 |
| PAH - Phenanthrene | mg/kg DM | 27.5 | 44 | 49 | 30 | 39 | 30 | 29 |
| PAH - Anthracene | mg/kg DM | 11.0 | 15 | 18 | 10 | 15 | 10 | 11 |
| PAH - Fluoranthene | mg/kg DM | 85.5 | 105 | 125 | 75 | 98 | 73 | 83 |
| PAH - Pyrene | mg/kg DM | 77.0 | 87 | 100 | 65 | 89 | 63 | 72 |
| PAH - Benzo(a) anthracene | mg/kg DM | 63.5 | 82 | 85 | 58 | 79 | 56 | 73 |
| PAH - Chrysene | mg/kg DM | 74.0 | 89 | 94 | 65 | 97 | 65 | 83 |
| PAH - Benzo(b) fluoranthene | mg/kg DM | 108.0 | 147 | 136 | 110 | 135 | 104 | 124 |
| PAH - Benzo(k) fluoranthene | mg/kg DM | 37.0 | 48 | 48 | 36 | 47 | 35 | 43 |
| PAH - Benzo(a)pyrene | mg/kg DM | 63.5 | 87 | 84 | 66 | 82 | 63 | 73 |
| PAH - Dibenzo(ah) anthracene | mg/kg DM | <12 | <15 | <15 | <13 | <14 | <12 | <14 |
| PAH - Indeno(123-cd) pyrene | mg/kg DM | 38.0 | 61 | 58 | 48 | 56 | 46 | 54 |
| PAH - Benzo(ghi) perylene | mg/kg DM | 38.5 | 58 | 54 | 46 | 52 | 43 | 51 |
| Total PAHs | mg/kg DM | 633.8 | 841.0 | 872.0 | 619.8 | 805.8 | 599.9 | 706.1 |

Example 3—Treatment of Contaminated Soil by an Aluminous Hydraulic Binder

The addition of 2.5% activated carbon AC1 coupled with 1% TEP makes it possible to significantly reduce the total PAH content, with a final total PAH content less than 300 mg/kg of dry matter is measured, corresponding to a reduction of approximately 60%.

TABLE 10

| Soil sample | Unit | SN1 | SN1 | SN1 | SN1 | SN1 | SN1 |
|---|---|---|---|---|---|---|---|
| Treatment | | — | 2% TEP | 1.5% AC1 + 1% TEP | 0.5% AC1 + 2% TEP | 1% AC1 + 1% TEP | 2.5% AC1 + 1% TEP |
| Soil dry matter | % of soil received | 92.0 | 89.4 | 88.6 | 89.0 | 88.5 | 88.5 |
| C10-C40 linear hydrocarbons | mg/kg DM | 1200.0 | 1100 | 1100 | 1200 | 1400 | 660 |
| C10-C12 linear hydrocarbons | mg/kg DM | <20 | <20 | <20 | <20 | <20 | <100 |
| C12-C16 linear hydrocarbons | mg/kg DM | 26.5 | 60 | 25 | 33 | 31 | <100 |
| C16-C21 linear hydrocarbons | mg/kg DM | 320.0 | 310 | 350 | 330 | 340 | 190 |
| >C21-C35 linear hydrocarbons | mg/kg DM | 820.0 | 660 | 680 | 850 | 950 | 420 |

TABLE 10-continued

| Soil sample | Unit | SN1 | SN1 | SN1 | SN1 | SN1 | SN1 |
|---|---|---|---|---|---|---|---|
| C35-C40 linear hydrocarbons | mg/kg DM | 39.0 | 28 | 28 | 55 | 55 | <100 |
| PAH - Naphthalene | mg/kg DM | 2.6 | 2.3 | 2.5 | 2.2 | 1.9 | 1.8 |
| PAH - Acenaphthylene | mg/kg DM | 0.7 | 0.72 | 1.1 | 0.57 | <0.5 | 0.67 |
| PAH - Acenaphthene | mg/kg DM | 4.1 | 4.1 | 4.3 | 3.5 | 2.8 | 3.5 |
| PAH - Fluorene | mg/kg DM | 3.1 | 2.8 | 2.9 | 2.6 | 2.0 | 1.9 |
| PAH - Phenanthrene | mg/kg DM | 27.5 | 25 | 26 | 25 | 20 | 18 |
| PAH - Anthracene | mg/kg DM | 11.0 | 8.1 | 10 | 8.2 | 7.1 | 5.0 |
| PAH - Fluoranthene | mg/kg DM | 85.5 | 78 | 124 | 66 | 66 | 47 |
| PAH - Pyrene | mg/kg DM | 77.0 | 64 | 113 | 54 | 56 | 40 |
| PAH - Benzo(a) anthracene | mg/kg DM | 63.5 | 47 | 61 | 46 | 44 | 18 |
| PAH - Chrysene | mg/kg DM | 74.0 | 51 | 77 | 48 | 50 | 23 |
| PAH - Benzo(b) fluoranthene | mg/kg DM | 108.0 | 78 | 113 | 80 | 79 | 40 |
| PAH - Benzo(k) fluoranthene | mg/kg DM | 37.0 | 25 | 36 | 26 | 25 | 11 |
| PAH - Benzo(a)pyrene | mg/kg DM | 63.5 | 44 | 62 | 48 | 44 | 17 |
| PAH - Dibenzo(ah) anthracene | mg/kg DM | <12 | 3.5 | <9.3 | <16 | <15 | <3.3 |
| PAH - Indeno(123-cd) pyrene | mg/kg DM | 38.0 | 28 | 43 | 28 | 26 | 7.8 |
| PAH - Benzo(ghi) perylene | mg/kg DM | 38.5 | 27 | 42 | 33 | 31 | 11 |
| Total PAHs | mg/kg DM | 633.8 | 488.0 | 717.6 | 471.0 | 454.6 | 245.1 |

TABLE 11

| Soil sample | Unit | SN2 | SN2 | SN2 | SN2 |
|---|---|---|---|---|---|
| Treatment | | — | 2.5/AC1 + 0.75% TEP | 2.5/AC1 + 0.5% TEP | 2.5/AC1 + 1% TEP |
| Soil dry matter | % of soil received | 96.9 | 88.1 | 88.3 | 89.1 |
| C10-C40 linear hydrocarbons | mg/kg DM | 1400.0 | 1100 | 1000 | 1100 |
| C10-C12 linear hydrocarbons | mg/kg DM | <70 | <20 | <40 | <40 |
| C12-C16 linear hydrocarbons | mg/kg DM | 43.0 | 36 | <40 | <40 |
| C16-C21 linear hydrocarbons | mg/kg DM | 450.0 | 340 | 310 | 340 |
| >C21-C35 linear hydrocarbons | mg/kg DM | 835.0 | 650 | 600 | 660 |
| C35-C40 linear hydrocarbons | mg/kg DM | <70 | 42 | 45 | 52 |
| PAH - Naphthalene | mg/kg DM | 4.3 | 3.0 | 2.6 | 2.6 |
| PAH - Acenaphthylene | mg/kg DM | <0.5 | 0.64 | <0.5 | <0.5 |
| PAH - Acenaphthene | mg/kg DM | 8.6 | 6.6 | 5.8 | 5.9 |
| PAH - Fluorene | mg/kg DM | 6.9 | 4.9 | 4.3 | 4.4 |
| PAH - Phenanthrene | mg/kg DM | 59.0 | 41 | 35 | 36 |
| PAH - Anthracene | mg/kg DM | 15.5 | 9.3 | 7.4 | 7.7 |
| PAH - Fluoranthene | mg/kg DM | 108.5 | 78 | 65 | 68 |

TABLE 11-continued

| Soil sample | Unit | SN2 | SN2 | SN2 | SN2 |
|---|---|---|---|---|---|
| PAH - Pyrene | mg/kg DM | 82.5 | 64 | 51 | 55 |
| PAH - Benzo(a) anthracene | mg/kg DM | 61.5 | 34 | 27 | 30 |
| PAH - Chrysene | mg/kg DM | 59.5 | 32 | 25 | 29 |
| PAH - Benzo(b) fluoranthene | mg/kg DM | 91.0 | 59 | 43 | 51 |
| PAH - Benzo(k) fluoranthene | mg/kg DM | 31.0 | 19 | 14 | 16 |
| PAH - Benzo(a)pyrene | mg/kg DM | 62.0 | 33 | 25 | 29 |
| PAH - Dibenzo(ah) anthracene | mg/kg DM | <12 | <6.6 | <6.3 | <7.0 |
| PAH - Indeno(123-cd) pyrene | mg/kg DM | 39.5 | 19 | 16 | 17 |
| PAH - Benzo(ghi) perylene | mg/kg DM | 37.0 | 23 | 17 | 19 |
| Total PAHs | mg/kg DM | 667.0 | 426.2 | 337.1 | 370.8 |

Example 4—Treatment of Contaminated Soil by a Portland Mineral Binder of Type CEM I The tests summarized in the table below show that the use of a CEM I type Portland cement to treat a contaminated soil makes it possible to reduce the PAH content but less effectively than the combination of a Portland binder with activated carbon.

TABLE 12

| Soil sample | Unit | SN1 | SN2 | SN1 | SN2 | SN2 | SN2 |
|---|---|---|---|---|---|---|---|
| Treatment | | — | — | 3% CEM I SPLC | 6% CEM I SPLC | 10% CEM I SPLC | 1% AC1 + 10% CEM I SPLC |
| Soil dry matter | % of soil received | 92.0 | 96.9 | 89.8 | 89.7 | 91.6 | 90.8 |
| C10-C40 linear hydrocarbons | mg/kg DM | 1200.0 | 1400.0 | 1300 | 4700 | 5300 | 1300 |
| C10-C12 linear hydrocarbons | mg/kg DM | <20 | <70 | <40 | <100 | <100 | <40 |
| C12-C16 linear hydrocarbons | mg/kg DM | 26.5 | 43.0 | <40 | 190 | 170 | <40 |
| C16-C21 linear hydrocarbons | mg/kg DM | 320.0 | 450.0 | 280 | 1700 | 1700 | 390 |
| >C21-C35 linear hydrocarbons | mg/kg DM | 820.0 | 835.0 | 950 | 2700 | 3300 | 810 |
| C35-C40 linear hydrocarbons | mg/kg DM | 39.0 | <70 | 53 | 130 | 170 | 51 |
| PAH - Naphthalene | mg/kg DM | 2.6 | 4.3 | 1.4 | 5.2 | 4.1 | <5.0 |
| PAH - Acenaphthylene | mg/kg DM | 0.7 | <0.5 | <0.5 | 0.57 | <0.5 | <5.0 |
| PAH - Acenaphthene | mg/kg DM | 4.1 | 8.6 | 2.3 | 10 | 9.1 | 5.8 |
| PAH - Fluorene | mg/kg DM | 3.1 | 6.9 | 1.8 | 8.4 | 6.9 | <5.0 |
| PAH - Phenanthrene | mg/kg DM | 27.5 | 59.0 | 17 | 75 | 59 | 43 |
| PAH - Anthracene | mg/kg DM | 11.0 | 15.5 | 6.7 | 19 | 16 | 11 |
| PAH - Fluoranthene | mg/kg DM | 85.5 | 108.5 | 57 | 134 | 109 | 77 |
| PAH - Pyrene | mg/kg DM | 77.0 | 82.5 | 50 | 95 | 84 | 61 |
| PAH - Benzo(a) anthracene | mg/kg DM | 63.5 | 61.5 | 43 | 57 | 56 | 42 |

TABLE 12-continued

| Soil sample | Unit | SN1 | SN2 | SN1 | SN2 | SN2 | SN2 |
|---|---|---|---|---|---|---|---|
| PAH - Chrysene | mg/kg DM | 74.0 | 59.5 | 51 | 67 | 58 | 46 |
| PAH - Benzo(b) fluoranthene | mg/kg DM | 108.0 | 91.0 | 91 | 96 | 83 | 62 |
| PAH - Benzo(k) fluoranthene | mg/kg DM | 37.0 | 31.0 | 29 | 37 | 32 | 23 |
| PAH - Benzo(a)pyrene | mg/kg DM | 63.5 | 62.0 | 51 | 72 | 62 | 41 |
| PAH - Dibenzo(ah) anthracene | mg/kg DM | <12 | <12 | <17 | <12 | <11 | <9.0 |
| PAH - Indeno(123-cd) pyrene | mg/kg DM | 38.0 | 39.5 | 31 | 38 | 33 | 25 |
| PAH - Benzo(ghi) perylene | mg/kg DM | 38.5 | 37.0 | 36 | 42 | 35 | 25 |
| Total PAHs | mg/kg DM | 633.8 | 667.0 | 468.8 | 755.8 | 646.7 | 461.8 |

Example 5—Treatment of Contaminated Soil by a Portland Mineral Binder with Blast Furnace Slag of Type CEM III The results presented in the table below show that the association of type CEM III A cement makes it possible to significantly reduce the PAH content in contaminated soil: the final contents, in the case of contaminated soil SN1, are all less than 400 mg/kg of soil dry matter. The best performances measured correspond to a reduction of 43% of the total PAH content, with an activated carbon quantity of 2% and CEM III A LM of 2%.

The results obtained with contaminated soil SN2 are also positive and here the best performances are obtained with the association of CEM III A at a quantity of 3% and activated carbon at a quantity of 2%.

TABLE 13

| Soil sample | Unit | SN1 | SN1 | SN1 | SN1 | SN1 |
|---|---|---|---|---|---|---|
| Treatment | | — | 1.5% AC1 + 1% CEM III A LM | 3/AC1 · 1% CEM III A LM | 2% AC1 + 2% CEM III A LM | 2% AC1 + 3% CEM III ALM |
| Soil dry matter | % of soil received | 92.0 | 88.4 | 89.0 | 90.2 | 90.5 |
| C10-C40 linear hydrocarbons | mg/kg DM | 1200.0 | 1000 | 1100 | 840 | 860 |
| C10-C12 linear hydrocarbons | mg/kg DM | <20 | <20 | <20 | <20 | <20 |
| C12-C16 linear hydrocarbons | mg/kg DM | 26.5 | 32 | 24 | <20 | <20 |
| C16-C21 linear hydrocarbons | mg/kg DM | 320.0 | 280 | 260 | 220 | 230 |
| >C21-C35 linear hydrocarbons | mg/kg DM | 820.0 | 670 | 750 | 580 | 570 |
| C35-C40 linear hydrocarbons | mg/kg DM | 39.0 | 35 | 36 | 23 | 28 |
| PAH - Naphthalene | mg/kg DM | 2.6 | 3.7 | 1.8 | <5.0 | <5.0 |
| PAH - Acenaphthylene | mg/kg DM | 0.7 | 0.90 | 0.60 | <5.0 | <5.0 |
| PAH - Acenaphthene | mg/kg DM | 4.1 | 5.8 | 3.7 | <5.0 | <5.0 |
| PAH - Fluorene | mg/kg DM | 3.1 | 3.8 | 2.0 | <5.0 | <5.0 |
| PAH - Phenanthrene | mg/kg DM | 27.5 | 32 | 19 | 20 | 22 |
| PAH - Anthracene | mg/kg DM | 11.0 | 10 | 5.5 | 6.7 | 7.1 |
| PAH - Fluoranthene | mg/kg DM | 85.5 | 80 | 60 | 53 | 56 |
| PAH - Pyrene | mg/kg DM | 77.0 | 67 | 54 | 45 | 52 |
| PAH - Benzo(a) anthracene | mg/kg DM | 63.5 | 48 | 31 | 32 | 34 |
| PAH - Chrysene | mg/kg DM | 74.0 | 62 | 39 | 40 | 41 |
| PAH - Benzo(b) fluoranthene | mg/kg DM | 108.0 | 84 | 82 | 64 | 64 |

TABLE 13-continued

| Soil sample | Unit | SN1 | SN1 | SN1 | SN1 | SN1 |
|---|---|---|---|---|---|---|
| PAH - Benzo(k) fluoranthene | mg/kg DM | 37.0 | 28 | 22 | 22 | 23 |
| PAH - Benzo(a)pyrene | mg/kg DM | 63.5 | 49 | 28 | 33 | 34 |
| PAH - Dibenzo(ah) anthracene | mg/kg DM | <12 | <7.9 | <5.1 | <7.0 | <7.0 |
| PAH - Indeno(123-cd) pyrene | mg/kg DM | 38.0 | 36 | 12 | 18 | 18 |
| PAH - Benzo(ghi) perylene | mg/kg DM | 38.5 | 34 | 17 | 21 | 21 |
| Total PAHs | mg/kg DM | 633.8 | 543.8 | 378.8 | 355.9 | 372.8 |

TABLE 14

| Soil sample | Unit | SN2 | SN2 | SN2 | SN2 | SN2 |
|---|---|---|---|---|---|---|
| Treatment | | — | 3% AC1 + 1% CEM III ALM | 3% AC1 + 2% CEM III ALM | 3% AC1 + 0.5% CEM III A LM | 1% AC1 + 10% CEM III ALM |
| Soil dry matter | % of soil received | 96.9 | 89.4 | 88.9 | 88.6 | 90.3 |
| C10-C40 linear hydrocarbons | mg/kg DM | 1400.0 | 910 | 1000 | 1100 | 1200 |
| C10-C12 linear hydrocarbons | mg/kg DM | <70 | <40 | <40 | <20 | <40 |
| C12-C16 linear hydrocarbons | mg/kg DM | 43.0 | <40 | <40 | 45 | <40 |
| C16-C21 linear hydrocarbons | mg/kg DM | 450.0 | 310 | 330 | 400 | 370 |
| >C21-C35 linear hydrocarbons | mg/kg DM | 835.0 | 500 | 630 | 670 | 760 |
| C35-C40 linear hydrocarbons | mg/kg DM | <70 | <40 | 48 | 43 | 48 |
| PAH - Naphthalene | mg/kg DM | 4.3 | 5.0 | 2.8 | 4.3 | <5.0 |
| PAH - Acenaphthylene | mg/kg DM | <0.5 | 0.75 | <0.5 | 0.77 | <5.0 |
| PAH - Acenaphthene | mg/kg DM | 8.6 | 6.4 | 6.1 | 8.5 | 6.6 |
| PAH - Fluorene | mg/kg DM | 6.9 | 5.4 | 4.3 | 6.1 | <5.0 |
| PAH - Phenanthrene | mg/kg DM | 59.0 | 45 | 35 | 49 | 44 |
| PAH - Anthracene | mg/kg DM | 15.5 | 7.5 | 7.2 | 10 | 11 |
| PAH - Fluoranthene | mg/kg DM | 108.5 | 72 | 65 | 91 | 81 |
| PAH - Pyrene | mg/kg DM | 82.5 | 57 | 52 | 73 | 64 |
| PAH - Benzo(a) anthracene | mg/kg DM | 61.5 | 26 | 26 | 35 | 43 |
| PAH - Chrysene | mg/kg DM | 59.5 | 23 | 24 | 32 | 41 |
| PAH - Benzo(b) fluoranthene | mg/kg DM | 91.0 | 41 | 42 | 59 | 65 |
| PAH - Benzo(k) fluoranthene | mg/kg DM | 31.0 | 13 | 13 | 19 | 25 |
| PAH - Benzo(a)pyrene | mg/kg DM | 62.0 | 23 | 25 | 32 | 42 |
| PAH - Dibenzo(ah) anthracene | mg/kg DM | <12 | <5.7 | <5.9 | <6.2 | <11 |

TABLE 14-continued

| Soil sample | Unit | SN2 | SN2 | SN2 | SN2 | SN2 |
|---|---|---|---|---|---|---|
| PAH - Indeno(123-cd) pyrene | mg/kg DM | 39.5 | 13 | 15 | 18 | 27 |
| PAH - Benzo(ghi) perylene | mg/kg DM | 37.0 | 16 | 16 | 21 | 27 |
| Total PAHs | mg/kg DM | 667.0 | 355.0 | 331.9 | 459.0 | 477.3 |

Example 6—Treatment of Slightly Contaminated Soil by a Portland Mineral Binder with Blast Furnace Slag of Type CEM III The results summarized in the table below show that the association of a type CEM III A Portland cement with an activated carbon is effective to treat soils slightly contaminated with PAHs.

TABLE 15

| Soil sample | | SSL | SSL | SSL | SSL | SSL |
|---|---|---|---|---|---|---|
| Treatment | Unit | — | +1.0% AC3 + 1.0% CEM III ALM | +2.5% AC3 + 1.0% CEM III ALM | +3% AC3 + 1.0% CEM III ALM | +3.5% AC3 + 1.0% CEM III A |
| Dry matter | % mass MB | 95.7 | 89.5 | 89.9 | 89.5 | 90.0 |
| C10-C40 hydrocarbon index | mg/kg DM | 340 | 44 | 39 | <20 | <20 |
| >C10-C12 Hydrocarbons | mg/kg DM | <40 | <20 | <20 | <20 | <20 |
| >C12-C16 Hydrocarbons | mg/kg DM | <40 | <20 | <20 | <20 | <20 |
| >C16-C21 Hydrocarbons | mg/kg DM | 110 | <20 | <20 | <20 | <20 |
| >C21-C35 Hydrocarbons | mg/kg DM | 200 | <20 | <20 | <20 | <20 |
| >C35-C40 Hydrocarbons | mg/kg DM | <40 | <20 | <20 | <20 | <20 |
| PAH - Naphthalene | mg/kg DM | 1.3 | 0.88 | 1.6 | 0.50 | 0.42 |
| PAH - Acenaphthylene | mg/kg DM | <0.5 | <0.05 | <0.05 | <0.05 | <0.05 |
| PAH - Acenaphthene | mg/kg DM | 2.4 | 1.5 | 2.1 | 0.87 | 0.79 |
| PAH - Fluorene | mg/kg DM | 1.8 | 0.85 | 1.2 | 0.51 | 0.43 |
| PAH - Phenanthrene | mg/kg DM | 16 | 5.1 | 6.8 | 2.9 | 2.2 |
| PAH - Anthracene | mg/kg DM | 3.8 | 1.2 | 1.8 | 0.64 | 0.47 |
| PAH - Fluoranthene | mg/kg DM | 27 | 6.1 | 7.0 | 3.1 | 2.0 |
| PAH - Pyrene | mg/kg DM | 21 | 4.5 | 5.1 | 2.2 | 1.4 |
| PAH - Benzo(a) anthracene | mg/kg DM | 16 | 1.8 | 1.9 | 0.75 | 0.37 |
| PAH - Chrysene | mg/kg DM | 14 | 1.5 | 1.6 | 0.65 | 0.31 |
| PAH - Benzo(b) fluoranthene | mg/kg DM | 21 | 1.6 | 1.4 | 0.73 | 0.27 |
| PAH - Benzo(k) fluoranthene | mg/kg DM | 8.5 | 0.65 | 0.63 | 0.29 | 0.11 |
| PAH - Benzo(a)pyrene | mg/kg DM | 16 | 0.92 | 0.91 | 0.37 | 0.14 |
| PAH - Dibenzo(ah) anthracene | mg/kg DM | <3.4 | <0.17 | <0.16 | <0.08 | <0.05 |

TABLE 15-continued

| Soil sample | | SSL | SSL | SSL | SSL | SSL |
|---|---|---|---|---|---|---|
| PAH - Indeno(123-cd) pyrene | mg/kg DM | 10 | 0.45 | 0.42 | 0.18 | 0.07 |
| PAH - Benzo(ghi) perylene | mg/kg DM | 9.7 | 0.42 | 0.41 | 0.18 | 0.07 |
| Total PAH | mg/kg DM | 168.5 | 27.5 | 32.9 | 13.9 | 9.1 |

The invention claimed is:

1. A method for treating a soil containing 3 to 50% by weight water, said soil being-contaminated with hydrocarbons, and said method comprising at least one step of working the soil with, by weight of soil:

from 0.1 to 12% activated carbon to adsorb hydrocarbons from the soil; and from 0.1 to 10% hydraulic binder to encapsulate the activated carbon and to prevent the release of adsorbed hydrocarbons, wherein the hydraulic binder comprises calcium aluminate cement, and wherein the hydraulic binder/activated carbon ratio is comprised between 0.2 and 1.

2. The method according to claim 1, wherein the activated carbon has a specific surface area greater than 100 $m^2/g$.

3. The method according to claim 1, wherein the hydraulic binder further comprises a Portland cement chosen from a CEM I, CEM II, CEM III, CEM IV, CEM V as defined in standard NF EN 197-1 of April 2012 or a sulfoaluminate cement.

4. The method according to claim 1, wherein the hydraulic binder and the activated carbon are added simultaneously to the soil.

5. The method according to claim 1, wherein the activated carbon and the hydraulic binder are added separately to the soil.

6. The method according to claim 1, wherein the soil is contaminated with polycyclic aromatic hydrocarbons.

7. The method according to claim 1, wherein the total content of activated carbon and hydraulic binder is between 0.5% and 15%.

8. The method according to claim 2, wherein the activated carbon has a specific surface area greater than 400 $m^2/g$.

9. The method according to claim 2, wherein the activated carbon is grafted with additional chemical functions.

10. The method according to claim 5, wherein the activated carbon is added first.

11. The method according to claim 1, wherein the activated carbon comprises a D50 between 5 and 100 μm.

12. The method according to claim 1, wherein the activated carbon has a specific surface area greater than 500 $m^2/g$.

13. The method according to claim 7, wherein the total content of activated carbon and hydraulic binder is between 2% and 5%.

14. The method according to claim 3, wherein the hydraulic binder further comprises a Portland cement chosen from a CEM II, CEM III, CEM IV, CEM V as defined in standard NF EN 197-1 of April 2012 or a sulfoaluminate cement.

15. A method for the treatment of soil contaminated by hydrocarbons comprising a step of contacting the soil with a composition comprising in % by weight: between 70 to 80% of a hydraulic binder for encapsulating the activated carbon after adsorption of hydrocarbons in the soil, and between 20 and 30% of activated carbon, wherein the hydraulic binder comprises calcium aluminate cement, and wherein the hydraulic binder/activated carbon ratio is comprised between 0.2 and 1.

16. The method according to claim 15, wherein the hydrocarbons are polycyclic aromatic hydrocarbons.

* * * * *